Jan. 5, 1926.
F. B. HARRISON
DUST GUARD
Filed Feb. 8, 1924
1,568,554
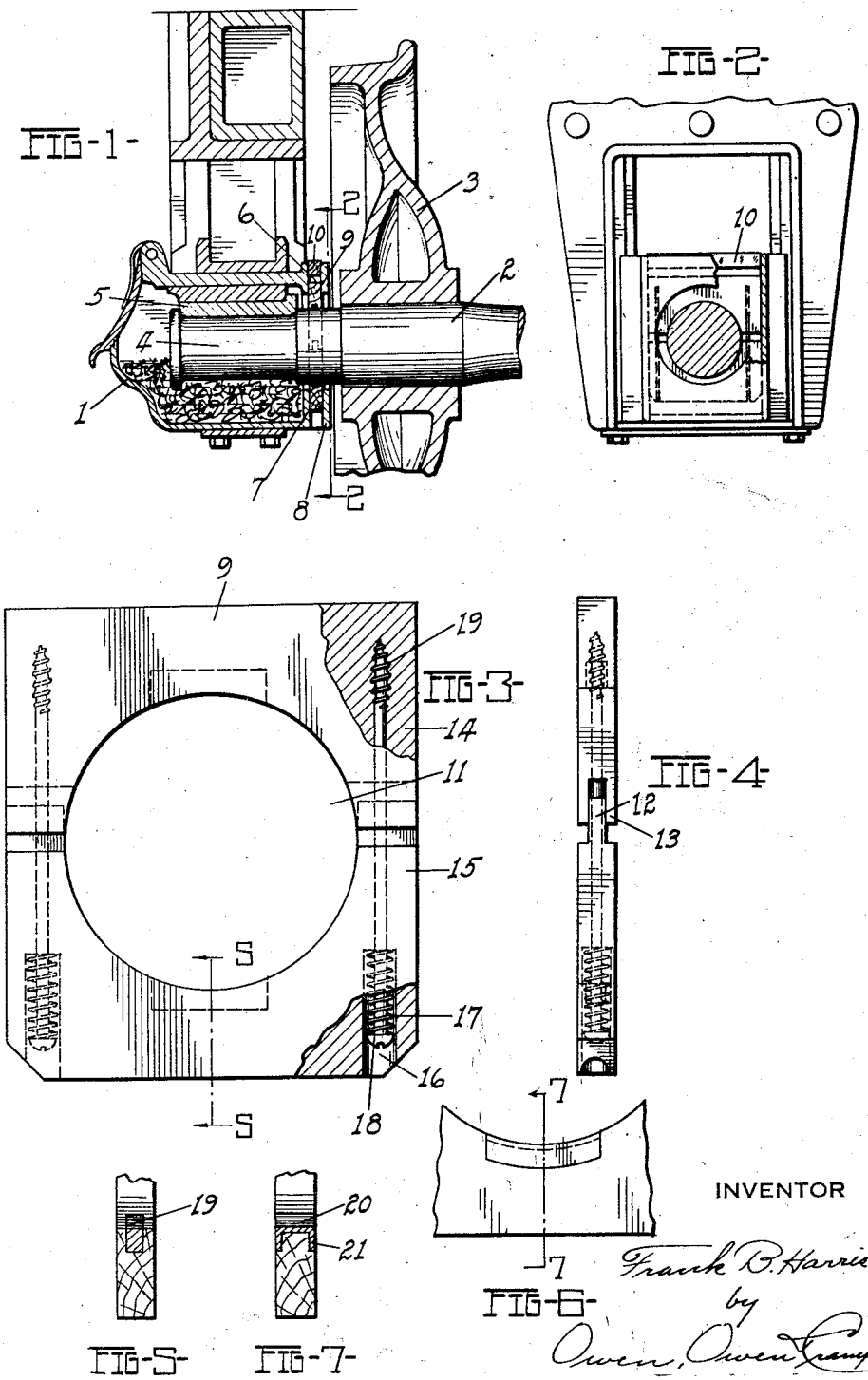
INVENTOR
Frank B. Harrison
by
Owen, Owen & Crampton Patented Jan. 5, 1926.

1,568,554

UNITED STATES PATENT OFFICE.

FRANK B. HARRISON, OF TOLEDO, OHIO.

DUST GUARD.

Application filed February 8, 1924. Serial No. 691,328.

*To all whom it may concern:*

Be it known that I, FRANK B. HARRISON, a citizen of the United States, and a resident of Toledo, in the county of Lucas and State of Ohio, have invented a new and useful Dust Guard, which invention is fully set forth in the following specification.

My invention relates to dust guards for axles, shafts and rotatably or slidably supported members generally that are located where dust of any material is liable to enter between bearing parts and become a cause of wear of the bearings.

The invention has for its object to provide an efficient dust guard that will be elastically maintained in its protective relation to the rotatable member and is formed of material that will give it long endurance or life and thus eliminate the necessity of or greatly reduce replacement, and moreover will prevent creeping of gritty material, the objectionable part of the dust so far as the bearing is concerned, along the rotatable member and into the bearings.

The invention may be contained in dust guards of different forms and for different purposes. To illustrate a practical application of the invention, I have selected a dust guard containing the invention and shall describe it hereinafter. The dust guard selected is illustrated in the accompanying drawings.

Figure 1 of the drawings is a vertical sectional view of a railroad car axle box having a dust guard. Fig. 2 is a sectional view taken on the line 2—2 indicated in Fig. 1. Fig. 3 is a side view of the dust guard. Fig. 4 is an edge view of the dust guard. Fig. 5 is a sectional view taken on the line 5—5 indicated in Fig. 3 and shows an insert that forms a bearing part of the guard. Fig. 6 is a side view of a part of the guard showing one side of a modification of the insert shown in Figs. 3 and 5. Fig. 7 is a sectional view taken on the line 7—7 indicated in Fig. 6.

The embodiment of the invention selected as an example is particularly designed for use in connection with axle boxes of railroad cars. 1 is the axle or grease box of the type well known. 2 is the axle on which the wheels 3 are located. The bearing parts 4 and 5 are located in the axle box 1. These parts are constructed in the manner well known in the art.

The axle box is provided with a chamber 6 formed by the closely positioned walls 7 and 8. The dust guard 9 is located in the chamber 6, which is closed and covered by the wooden wedge-shaped strip 10.

The dust guard 9 is formed of two pieces of board that when placed together are of a size that they will substantially fill the chamber 6. Each of the pieces have a semi-circular recess such that when the pieces are placed together a circular opening 11 is formed having a diameter substantially the same as the diameter of the axle at the point that it extends through the chamber 6. The pieces thus closely fit around the axle 2. They are provided with dove-tailing parts 12 and 13 located at the sides of the axle 2 and so as to close the space between the pieces when they are separated from each other a short distance. The pieces thus formed constitute the parts 14 and 15 of the dust guard, which are connected together by suitable means for elastically drawing the parts about the axle 2.

The lower part 15, which is located below the axle, is provided with recesses 16 in which spiral compression springs 17 are located and bolts 18 are inserted through suitable holes extending substantially parallel to the side edges of the dust guard 9, into the upper part 14 of the dust guard and through the springs 17. The size of the holes or bores are about the same as the bolts 18. The upper ends of the bolts are provided with threaded portions 19 whereby the bolts may be secured into the upper part. The bolts are thus inserted upward through the dust guards, suitable openings being left in the bottom of the chamber 6 that register with the recesses 16 for permitting a screw driver to be inserted to secure the rods 18 in position in the dust guard. The springs 17 are located between the heads of the bolts 18 and the bottoms of the recesses 16 and thus the parts 14 and 15 of the dust guard are elastically drawn together, and yet no dust can enter from above and pass the bolts through the dust guard. Although the dove-tailing parts 12 and 13 fit tight, the springs 17 are made sufficiently strong so as to draw the parts of the dust guard together notwithstanding any friction that may exist between the parts 12 and 13. The dust guard thus closely fits about the axle and prevents any dust from entering the axle box from the wheel side of the bearings.

In order to prevent rapid wear of the wooden dust guard, the dust guard is provided with metal bearing members that make contact, particularly when the wood is slightly worn away, with the axle, and constitute bearing points between the dust guard and the axle. The metal members may be the inserts 19 located in the upper and lower parts 14 and 15 of the dust guard and within the edge of the opening 11. The inserts 19 as shown in Figs. 3 and 5 are completely surrounded by the wood of the dust guard. The wood of the dust guard will not permit grit to creep into the bearings of the axle as is the case of metal dust guards. The oil which invariably works between the dust guard and the axle when metal dust guards are used, permits grit, in the rotation and the back and forth shifting of the axle relative to the axle box, to pass the dust guard along the axle and enter between the bearings of the axle to some extent. The wood of the dust guard on the other hand will absorb to a large extent the oil that may work from the axle box to the dust guard and will engage any such grit so that it will become engaged in the wood, that is, it will penetrate the surface of the wood and thus be retained by the dust guard. If desired, the form of the insert may be varied. In Figs. 6 and 7 a possibly more efficient bearing member is shown, although possibly somewhat less efficient from the standpoint of being dust-proof. The bearing member 20 shown in Figs. 6 and 7 is provided with depending flanges 21 and is secured in position by fitting the flanges into rabbeted portions of the wood.

I claim:—

A dust guard consisting of two wooden parts, each having approximately a semi-circular opening, a pair of bolts located within said parts, threaded end portions on said bolts having a diameter larger than the shank of the bolt, the bolt threaded into the upper of said parts, a spring located intermediate the head of the bolt and the lower of said parts for elastically drawing the parts together, the upper part having grooves, tongues on the lower part extending into said grooves, and a metallic bearing member in each part located in diametrically opposite relation, said members being inserted in said parts with the outer surfaces substantially flush with the edges of said openings.

In testimony whereof, I have hereunto signed my name to this specification.

FRANK B. HARRISON.